US012190869B2

(12) United States Patent
Sainath et al.

(10) Patent No.: US 12,190,869 B2
(45) Date of Patent: Jan. 7, 2025

(54) OPTIMIZING INFERENCE PERFORMANCE FOR CONFORMER

(71) Applicant: Google LLC, Mountain View, CA (US)

(72) Inventors: Tara N. Sainath, Jersey City, NJ (US); Rami Botros, Mountain View, CA (US); Anmol Gulati, Mountain View, CA (US); Krzysztof Choromanski, Mountain View, CA (US); Ruoming Pang, New York, NY (US); Trevor Strohman, Mountain View, CA (US); Weiran Wang, Mountain View, CA (US); Jiahui Yu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 259 days.

(21) Appl. No.: 17/936,547

(22) Filed: Sep. 29, 2022

(65) Prior Publication Data

US 2023/0130634 A1    Apr. 27, 2023

Related U.S. Application Data

(60) Provisional application No. 63/262,140, filed on Oct. 5, 2021.

(51) Int. Cl.
*G10L 15/16* (2006.01)
*G10L 15/06* (2013.01)
*G10L 15/22* (2006.01)

(52) U.S. Cl.
CPC ............ *G10L 15/16* (2013.01); *G10L 15/063* (2013.01); *G10L 15/22* (2013.01); *G10L 2015/223* (2013.01)

(58) Field of Classification Search
CPC ....... G10L 15/16; G10L 15/063; G10L 15/22; G10L 2015/223; G06N 3/09; G06N 3/0442; G06N 3/0455; G06N 3/0464; G06N 3/047
USPC .......................................... 704/232
See application file for complete search history.

(56) References Cited

U.S. PATENT DOCUMENTS

2020/0349922 A1* 11/2020 Peyser .................. G10L 15/063
2021/0280170 A1    9/2021 Chen et al.

OTHER PUBLICATIONS

International Search Report and Written Opinion for the related Application No. PCT/US2022/077247, dated Jan. 3, 2023, 59 pages.
(Continued)

*Primary Examiner* — Thierry L Pham
(74) *Attorney, Agent, or Firm* — Honigman LLP; Brett A. Krueger; Grant Griffith

(57) ABSTRACT

A computer-implemented method includes receiving a sequence of acoustic frames as input to an automatic speech recognition (ASR) model. Here, the ASR model includes a causal encoder and a decoder. The method also includes generating, by the causal encoder, a first higher order feature representation for a corresponding acoustic frame in the sequence of acoustic frames. The method also includes generating, by the decoder, a first probability distribution over possible speech recognition hypotheses. Here, the causal encoder includes a stack of causal encoder layers each including a Recurrent Neural Network (RNN) Attention-Performer module that applies linear attention.

18 Claims, 12 Drawing Sheets

(56) References Cited

OTHER PUBLICATIONS

Li Bo et al: "A Better and Faster end-to-end Model for Streaming ASR", ICASSP 2021-2021 IEEE International Conference on Acoustics, Speech and Signal Processing (ICASSP), IEEE, Jun. 6, 2021 (Jun. 6, 2021), pp. 5634-5638, XP033955636, DOI: 10.1109/ICASSP39728.2021.9413899 [retrieved on Apr. 22, 2021], 5 pages.

* cited by examiner

OPTIMIZING INFERENCE PERFORMANCE FOR CONFORMER

CROSS REFERENCE TO RELATED APPLICATIONS

This U.S. Patent Application claims priority under 35 U.S.C. § 119 (e) to U.S. Provisional Application 63/262,140, filed on Oct. 5, 2021. The disclosure of this prior application is considered part of the disclosure of this application and is hereby incorporated by reference in its entirety.

TECHNICAL FIELD

This disclosure relates to optimizing inference performance for conformers.

BACKGROUND

Automated speech recognition (ASR) systems have evolved from multiple models where each model had a dedicated purposed to integrated models were a single neural network is used to directly map an audio waveform (i.e., input sequence) to an output sentence (i.e., output sequence). This integration has resulted in a sequence-to-sequence approach, which generates a sequence of words (or graphemes) when given a sequence of audio features. Oftentimes, these integrated models include multiple self-attention layers that maintain a large number of internal states. However, devices that implement these integrated models have limited memory bandwidth such that reading from each of these internals states results in increased latency of the ASR systems.

SUMMARY

One aspect of the disclosure provides an automated speech recognition (ASR) model including a causal encoder that includes a stack of causal encoder layers. The causal encoder is configured to receive a sequence of acoustic frames as input and generate, at each of a plurality of output steps, a first higher order feature representation for a corresponding acoustic frame in the sequence of acoustic frames. The ASR model also includes a decoder configured to receive, as input, the first higher order feature representation generated by the causal encoder at each of the plurality of output steps and generate, at each of the plurality of output steps, a first probability distribution over possible speech recognition hypotheses. Here, each causal encoder layer in the stack of causal encoder layers includes a Recurrent Neural Network (RNN) Attention-Performer module that applies linear attention.

Implementations of the disclosure may include one or more of the following optional features. In some implementations, during pre-training, each causal encoder layer includes a first feedforward module, a convolution module, a multi-head attention module, a second feedforward module, and a layernorm module. In these implementations, during fine-tune training, each causal encoder layer includes the first feedforward module, the convolution module, the RNN Attention-Performer module, the second feedforward module, and the layernorm module. Each causal encoder layer may be pre-trained using regular conformer training for the multi-head attention module and is fine-tuned by replacing the multi-head attention module with the RNN Attention-Performer module. Here, replacing the multi-head attention module with the RNN Attention-Performer module may include applying a trainable affine transformation to convert queries/keys from the pre-trained multi-head attention module into an RNN model of linear time and constant memory complexity in sequence length.

In some examples, the causal encoder further includes an initial stack of convolution blocks without self-attention. In some implementations, the ASR model further includes a non-causal encoder configured to receive, as input, the first higher order feature representation generated by the causal encoder at each of the plurality of output steps and generate, at each of the plurality of output steps, a second higher order feature representation for a corresponding higher order feature representation. Here, the decoder is further configured to receive, as input, the second higher order feature representation generated by the non-causal encoder at each of the plurality of output steps and generate, at each of the plurality of output steps, a second probability distribution over possible speech recognition hypotheses.

In some examples, the decoder includes a prediction network configured to receive, as input, a sequence of non-blank symbols output by a final softmax layer and generate, at each of the plurality of output steps, a dense representation. In these examples, the decoder also includes a joint network configured to: receive, as input, the dense representation generated by the prediction network at each of the plurality of output steps and one of the first higher order feature representation generated by the causal encoder at each of the plurality of output steps when the ASR model is operating in a streaming mode or the second higher order feature representation generated by the non-causal encoder at each of the plurality of output steps when the ASR model is operating in a non-streaming mode; and generate, at each of the plurality of output steps, one of the first probability distribution over possible speech recognition hypotheses when the ASR model is operating in the streaming mode or the second probability distribution over possible speech recognition hypotheses when the ASR model is operating in the non-streaming mode. The prediction network may include a long short-term memory (LSTM)-based prediction network. In some examples, the prediction network includes a V2 embedding look-up table.

Another aspect of the disclosure provides a computer-implemented method that when executed on data processing hardware causes the data processing hardware to perform operations for optimizing inference performance for conformers. The operations include receiving a sequence of acoustic frames as input to an automatic speech recognition (ASR) model. The ASR model includes a causal encoder and a decoder. The operations also include generating, by the causal encoder at each of a plurality of output steps, a first higher order feature representation for a corresponding acoustic frame in the sequence of acoustic frames. The operations also include generating, by the decoder at each of the plurality of output steps, a first probability distribution over possible speech recognition hypotheses. Here, the causal encoder includes a stack of causal encoder layers where each causal encoder layer in the stack of causal encoder layers includes a Recurrent Neural Network (RNN) Attention-Performer module that applies linear attention.

Implementations of the disclosure may include one or more of the following optional features. In some implementations, during pre-training of the ASR model, each causal encoder layer includes a first feedforward module, a convolution module, a multi-head attention module, a second feedforward module, and a layernorm module. In these implementations, during fine-tune training, each causal encoder layer includes the first feedforward module, the convolution module, the RNN Attention-Performer module, the second feedforward module, and the layernorm module. Here, the operations may further include pre-training each causal encoder layer using regular conformer training for the multi-head attention module and fine-tuning each causal encoder layer by replacing the multi-head attention module with the RNN Attention-Performer module. In some examples, replacing the multi-head attention module with the RNN Attention-Performer module includes applying a trainable affine transformation to convert queries/keys from the pre-trained multi-head attention module into an RNN model of linear time and constant memory complexity in sequence length.

The causal encoder may further include an initial stack of convolution blocks without self-attention. In some implementations, the operations further include generating, by a non-causal encoder of the ASR model at each of the plurality of output steps, a second higher order feature representation for a corresponding first higher order feature representation generated by the causal encoder and generating, by the decoder at each of the plurality of output steps, a second probability distribution over possible speech recognition hypotheses for a corresponding second higher order feature representation. In these implementations, the operations may further include: receiving, as input at a prediction network of the decoder, a sequence of non-blank symbols output by a final softmax layer; generating a dense representation by the prediction network; and generating, by a joint network of the decoder, one of the first probability distribution over possible speech recognition hypotheses when the ASR model is operating in a streaming mode or the second probability distribution over possible speech recognition hypotheses when the ASR model is operating in a non-streaming mode. In some examples, the prediction network includes a long short-term memory (LSTM)-based prediction network. The prediction network may include a V2 embedding look-up table.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

End-to-end (E2E) automated speech recognition (ASR) models are traditionally structured to operate in a streaming mode or a non-streaming mode. Conventionally, an E2E ASR model includes an encoder and a decoder as the main components. Applications that involve end-user interaction, like voice-search or on-device dictation, may require the model to perform recognition in a streaming fashion, where the words are expected to be output as they are spoken with as little latency as possible. This prevents the use of models that use future context to improve accuracy, such as bi-directional long short-term memory (LSTM). By contrast, applications such as offline video capturing do not require streaming recognition and may make full use of any available future context to improve performance.

The encoder of the E2E ASR models may include self-attention layers such as conformer or transformer layers. A drawback of these self-attention layers is that the number of internal states to maintain is much larger than for LSTM layers. Specifically, most of these internals states correspond to key and value tensors used for self-attention. As a result, latency of these E2E ASR models during inference increases due to the computational cost of repeatedly loading the large number of internal states.

Accordingly, implementations herein are directed towards an ASR model that includes a causal encoder (e.g., first encoder) having a stack of casual encoder layers. The causal encoder is configured to receive a sequence of acoustic frames corresponding to an utterance and generate a first higher order feature representation for a corresponding acoustic frame. The ASR model also includes a decoder configured to generate a first probability distribution over possible speech recognition hypotheses for a corresponding first higher order feature representation. Here, each casual encoder layer in the stack of encoder layers includes a Recurrent Neural Network (RNN) Attention-Performer module that applies linear attention during fine-tune training and inference of the ASR model. Advantageously, the causal encoder may retain the benefit derived from self-attention layers (e.g., conformer or transformer layers) during pre-training while using RNN Attention-Performer module layers during fine-tune training and inference thereby reducing latency and model size of the ASR model making the ASR model suitable for on-device applications. As will become apparent, the ASR model may also include a non-causal encoder (i.e., second encoder) connected in cascade to the causal encoder to further improve accuracy of the ASR model for applications where latency is not a limiting constraint.

Figure 1:
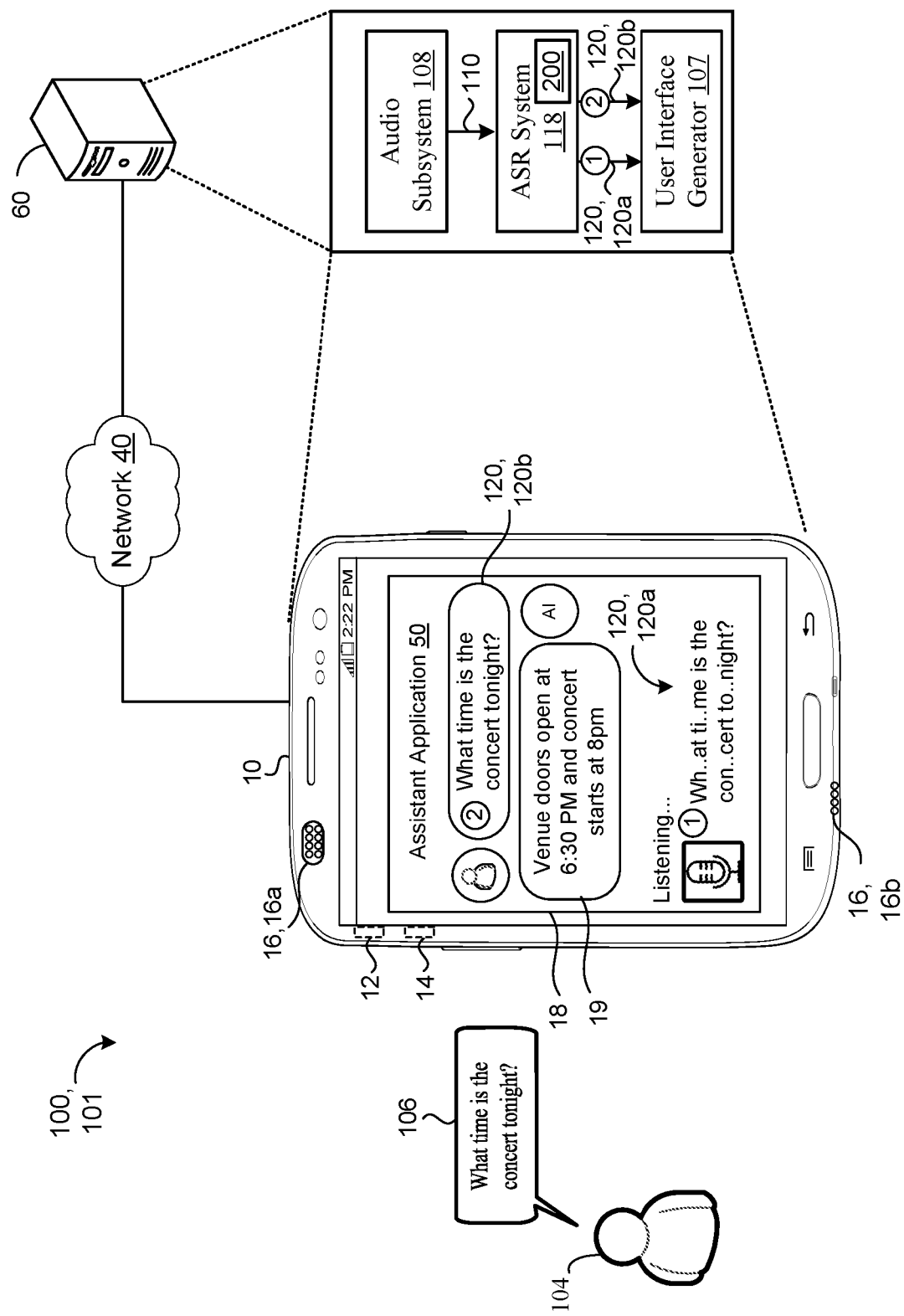
FIG. 1 is a schematic view of an example speech recognition system.

FIG. 1 is an example system 100 within a speech environment 101. In the speech environment 101, a user's 104 manner of interacting with a computing device, such as a user device 10, may be through voice input. The user device 10 (also referred to generally as a device 10) is configured to capture sounds (e.g., streaming audio data) from one or more users 104 within the speech environment 101. Here, the streaming audio data may refer to a spoken utterance 106 by the user 104 that functions as an audible query, a command for the user device 10, or an audible communication captured by the device 10. Speech-enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT)

devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 101 into electrical signals and a speech output device (e.g., speaker) 16, 16b for communicating an audible audio signal (e.g., as output audio data from the user device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

The system 100 includes an automated speech recognition (ASR) system 118 implementing an ASR model 200 that resides on the user device 10 of the user 104 and/or on a remote computing device 60 (e.g., one or more remote servers of a distributed system executing in a cloud-computing environment) in communication with the user device 10 via a network 40. In some examples, the ASR model 200 includes a recurrent neural network-transducer (RNN-T) model architecture. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., sequence of acoustic frames) 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model 200 receives (e.g., processes) each acoustic frame 110 in the sequence of acoustic frames 110.

In the example shown, the ASR model 200 may perform streaming speech recognition to produce an initial speech recognition result (e.g., candidate hypothesis) 120, 120a and generate a final speech recognition result (e.g., final hypothesis) 120, 120b by improving the initial speech recognition result 120a. The initial and final speech recognition result 120a, 120b may either correspond to a partial speech recognition result or an entire speech recognition result. Stated differently, the initial and final speech recognition result 120a, 120b may either correspond to a portion of an utterance 106 or an entire portion of an utterance 106. For example, the partial speech recognition result may correspond to a portion of a spoken utterance or even a portion of a spoken term. However, as will become apparent, the ASR model 200 performs additional processing on the final speech recognition result 120b whereby the final speech recognition result 120b may be delayed from the initial speech recognition result 120a.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition result 120a in a streaming fashion during time 1 and subsequently display the final speech recognition result 120b in a streaming fashion during time 2. Notably, the ASR model 200 outputs the final speech recognition result 120b in a streaming fashion even though the final speech recognition result 120b improves upon the initial speech recognition result 120a. In some configurations, the transcription 120 output from the ASR system 118 is processed (e.g., by a natural language understanding (NLU) module executing on the user device 10 or the remote computing device 60) to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition result 120a. During time 1, the user interface generator 107 presents, via the digital assistant interface 18, a representation of the initial speech recognition result 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition result 120b of the utterance 106 to the user 104 of the user device 10 a streaming fashion such that words, word pieces, and/or individual characters appear on the screen as soon as they are generated by the ASR model 200. In some implementations, the user interface generator 107 replaces the representation of the initial speech recognition result 120a presented at time 1 with the representation of the final speech recognition result 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition result 120a at an earlier time than the final speech recognition result 120b. For instance, as the final speech recognition result 120b is presumed to be more accurate than the initial speech recognition result 120a, the final speech recognition result 120b ultimately displayed as the transcription 120 may fix any terms that may have been misrecognized in the initial speech recognition result 120a. In this example, the streaming initial speech recognition result 120a output by the ASR model 200 is displayed on the screen of the user device 10 at time 1 are associated with low latency and provide responsiveness to the user 104 that his/her query is being processed, while the final speech recognition result 120b output by the ASR model 200 and displayed on the screen at time 2 leverages an additional speech recognition model and/or a language model to improve the speech recognition quality in terms of accuracy, but at increased latency. However, since the initial speech recognition result 120a are displayed as the user speaks the utterance 106, the higher latency associated with producing, and ultimately displaying the final speech recognition result 120b is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition result 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2A:
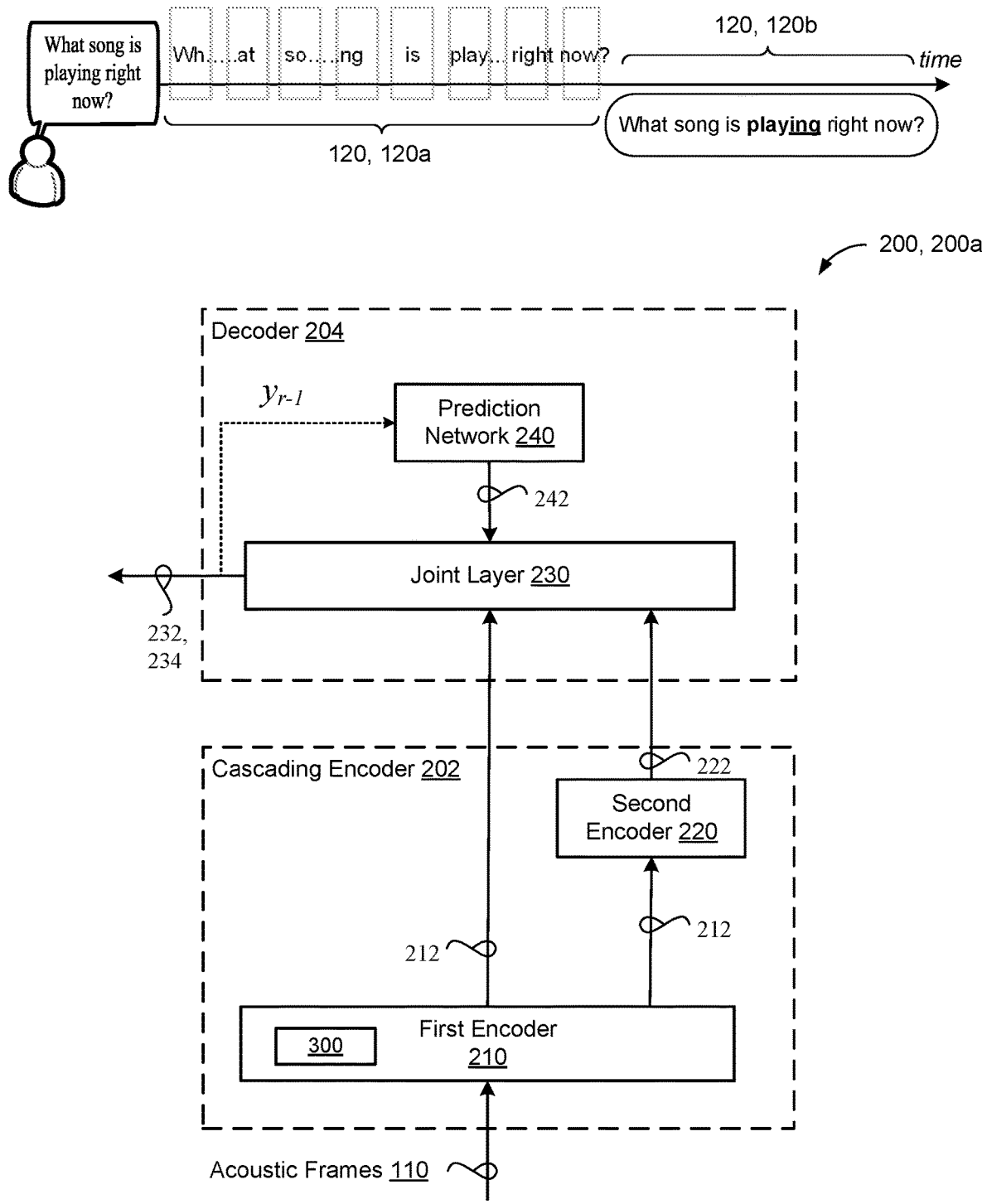
FIGS. 2A-2C are schematic views of an ASR model operating in various combinations of streaming and non-streaming modes.
Figure 2B:
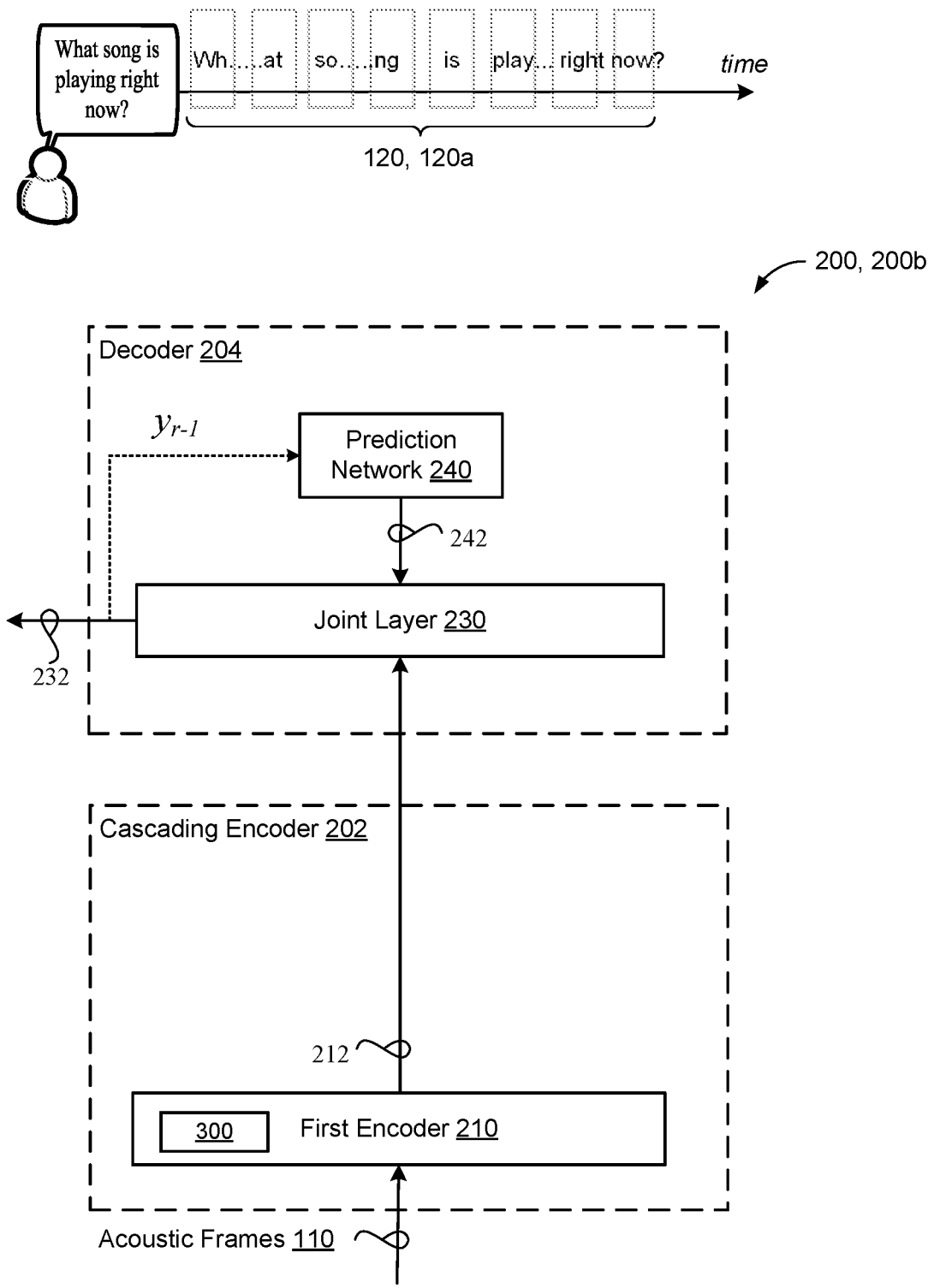
Figure 2C:
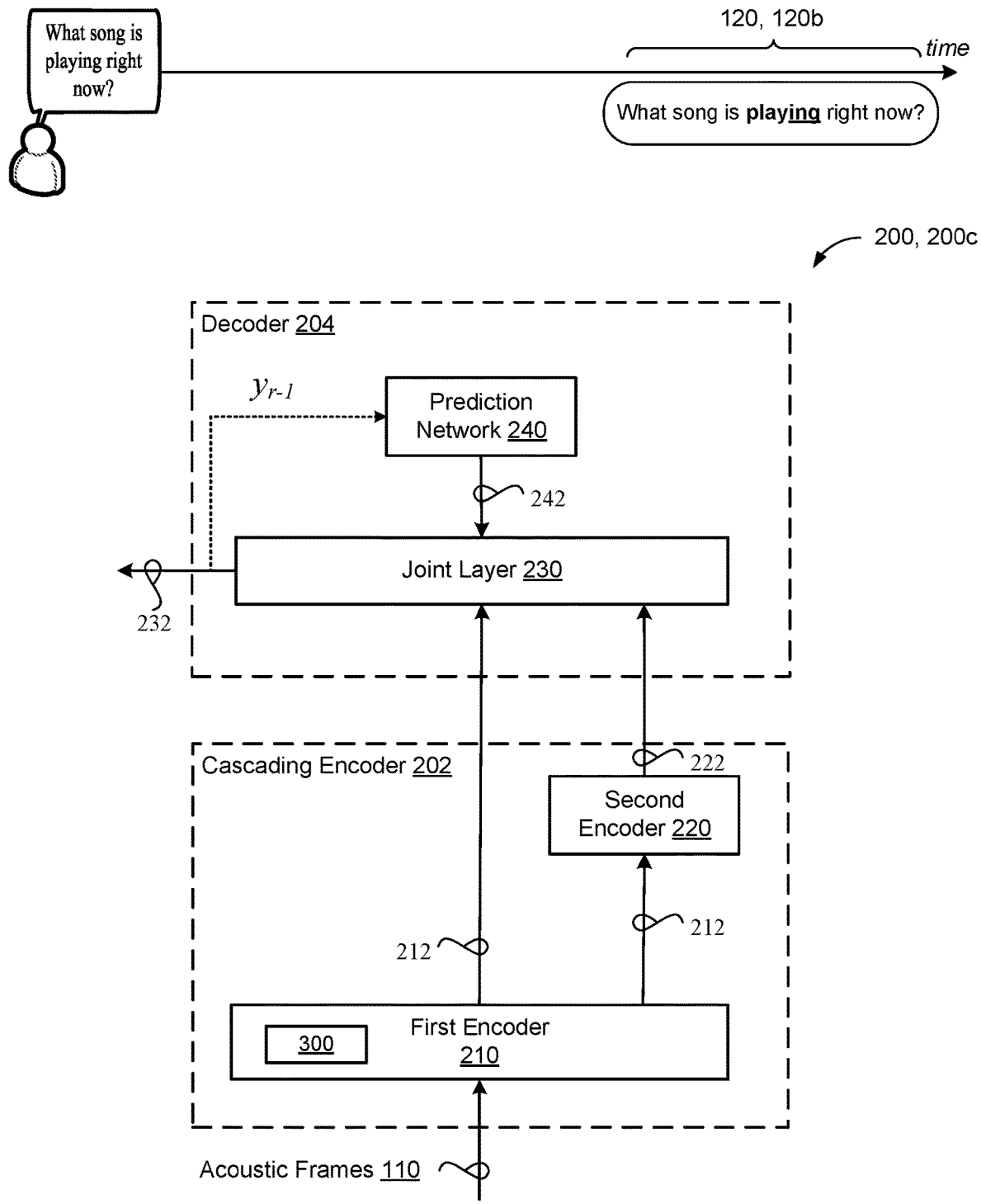

FIGS. 2A-2C include example ASR models 200a-c operating in various combinations of streaming and non-streaming modes. Specifically, each of the ASR models 200a-c includes an encoder 202 and a decoder 204. The encoder 202 may include a causal encoder (i.e., first encoder) 210 that includes a stack of causal encoder layers 300 and a non-causal encoder (i.e., second encoder) 220.

Figure 3A:
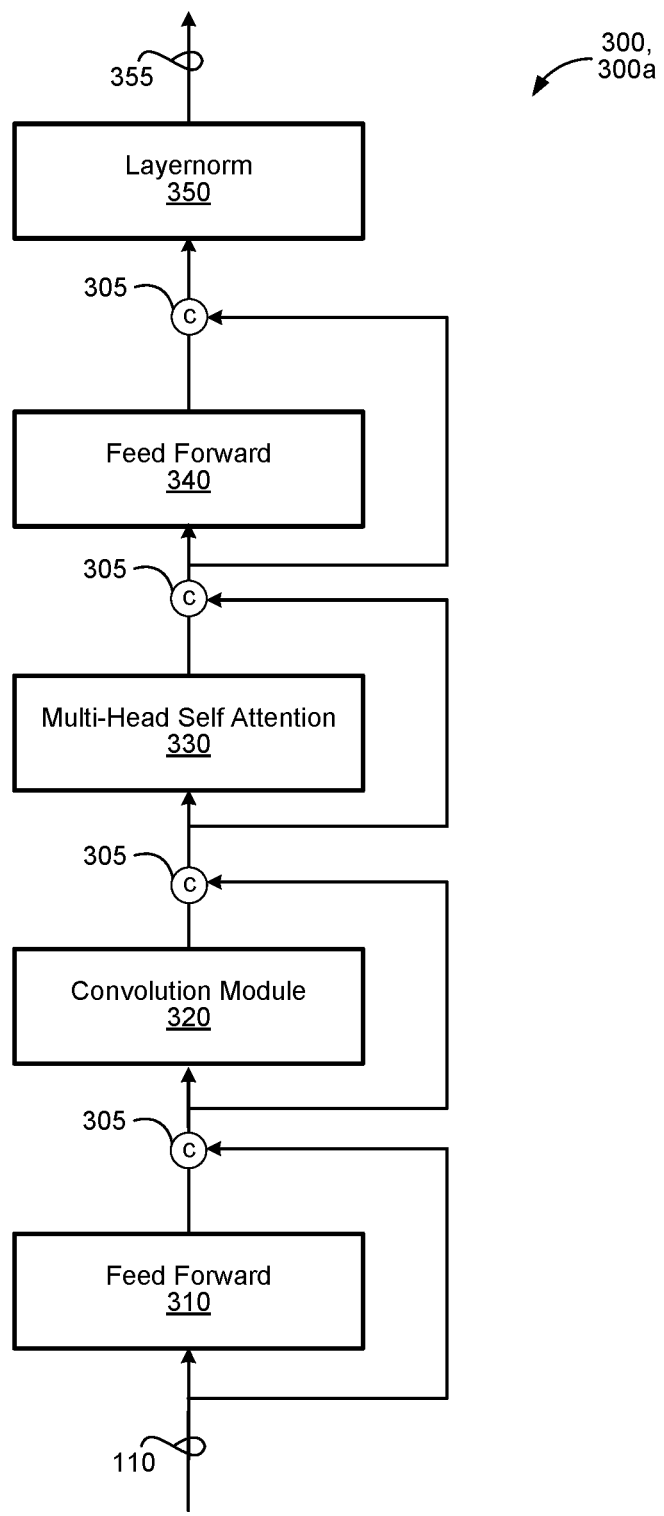
FIGS. 3A-3C are schematic views of various example causal encoder layers of the ASR model.
Figure 3B:
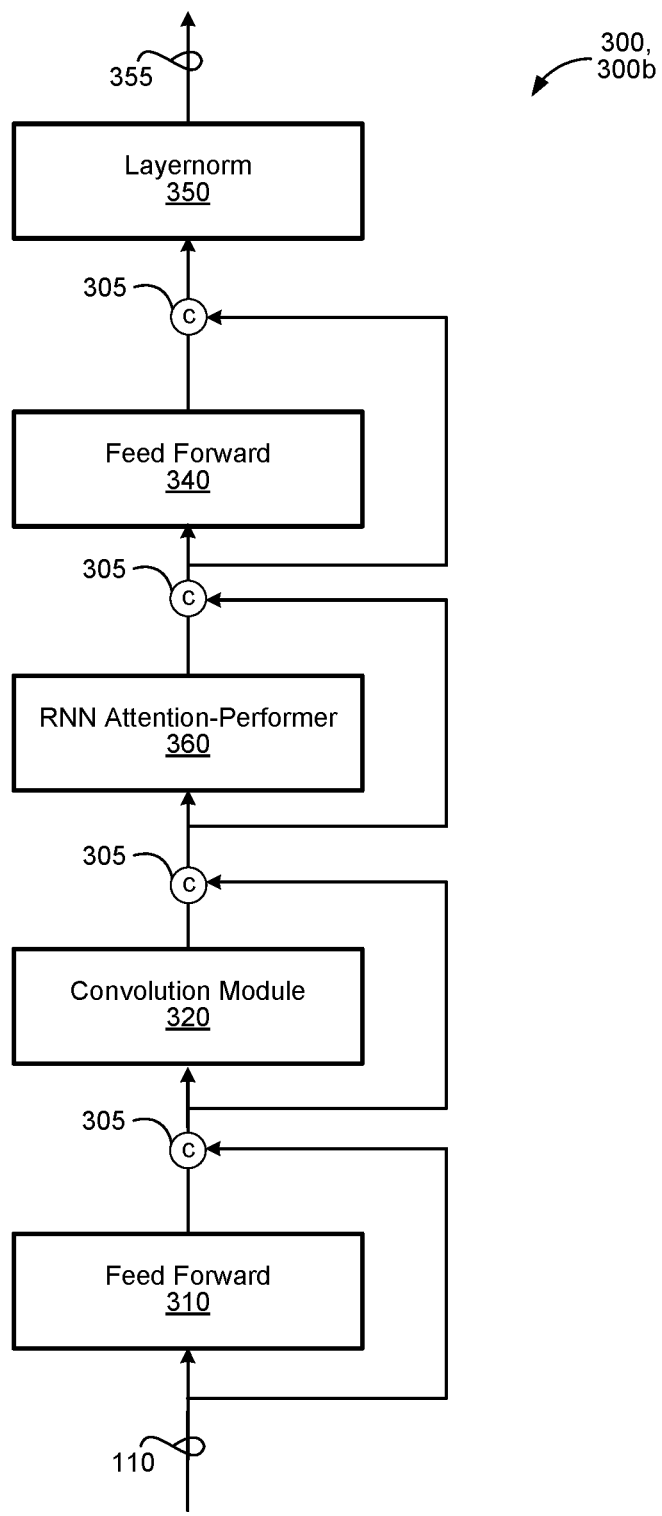
Figure 3C:
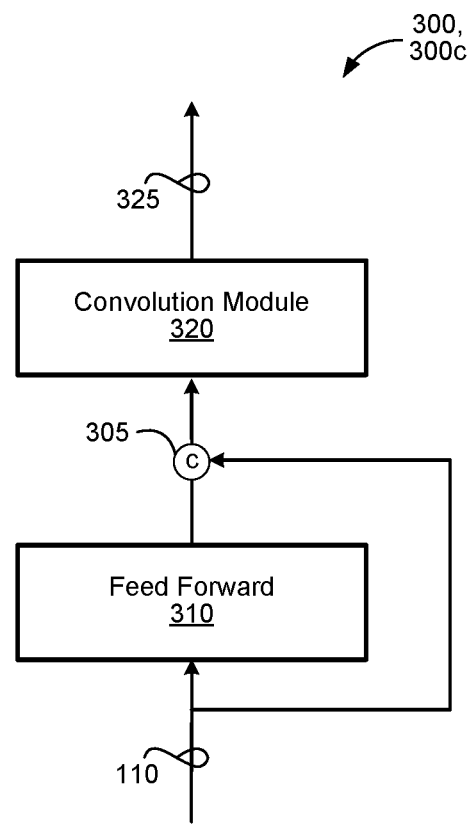

FIGS. 3A-3C illustrate various example causal encoder layers 300 of the first encoder 210. More specifically, FIG. 3A is a schematic view of a first example causal encoder layer (e.g., conformer or transformer layer) 300, 300a that may be used to implement one or more of the causal encoder layers 300 from the stack of causal encoder layers 300 of the first encoder 210. The first example causal encoder layer 300a includes a first half feed-forward layer 310, a second half feed-forward layer 340, with a convolution module 320 and a multi-head self-attention module 330 disposed between the first and second half feed-forward layers 310, 340, concatenation operators 305, and a layernorm module 350. The first half feed-forward layer 310 processes the sequence of acoustic frames 110 (e.g., Mel-spectrogram input sequence) by projecting the acoustic frames 110 into a larger dimension, followed by a non-linear activation, and then another linear layer to project the features back to the original dimensions. Subsequently, the convolution module 320 subsamples the sequence of acoustic frames 110 concatenated with the output of the first half feed-forward layer 310. That is, the convolution module 320 aggregates information from neighboring context to capture relative offset-based local interactions. The multi-head self-attention module 330 may include self-attention layers such as conformer or transformer layers. The multi-head self-attention module 330 receives the output of the convolution module 320 concatenated with the output of the first half feed-forward layer 310. Intuitively, the role of the multi-head self-attention module 330 is to summarize noise context separately for each input frame that is to be enhanced. The multi-head self-attention module 330 looks back L previous frames and converts an output into a fixed-length vector thereby capturing more global patterns. The multi-head self-attention module 330 maintains a large number of internal states. A significant portion of these internal states correspond to the key and value tensors of self-attention causing an increase in latency due to repeatedly loading each of these internal states (e.g., quadratic computational cost).

Thereafter, the second half feed-forward layer 340 receives a concatenation of the output of the multi-head self-attention module 330 and the output of the convolution module 320. The layernorm module 350 processes a concatenation of the output from the second half feed-forward layer 340 and the output of the multi-head self-attention module 330. That is, the first example causal encoder layer 300a transforms each acoustic frame 110 in the sequence of acoustic frames 110 (e.g., input features x), using modulation features m, to generate, at each output step, an output 355 for a corresponding acoustic frame 110 in the sequence of acoustic frames 110. More specifically, the first example causal encoder layer 300a may generate the output 355 by:

$$\hat{x} = x + r(m) \odot x + h(m) \quad (1)$$

$$\tilde{x} = \hat{x} + \frac{1}{2}FFN(\hat{x}), \tilde{n} = n + \frac{1}{2}FFN(n)$$

$$x' = \tilde{x} + Conv(\tilde{x}), n' = \tilde{n} + Conv(\tilde{n})$$

$$x'' = x' + MHCA(x', n')$$

$$x''' = x' \odot r(x'') + h(x'')$$

$$x'''' = x' + MHCA(x', x''')$$

$$y = LayerNorm\left(x'''' + \frac{1}{2}FFN(x'''')\right)$$

The output 355 of the first example causal encoder layer 300a is passed on to the next causal encoder layer 300 in the stack of causal encoder layers 300 of the first encoder 210. A last causal encoder layer 300 in the stack of causal encoder layers 300 generates a first higher order feature representation 212 for a corresponding acoustic frame 110 in the sequence of acoustic frames 110.

FIG. 3B is a schematic view of a second example causal encoder layer 300, 300b that may be used to implement one or more of the causal encoder layers 300 from the stack of causal encoder layers 300. The second example causal encoder layer 300b includes the first half feed-forward layer 310, the second half feed-forward layer 340, with the convolution module 320 and a Recurrent Neural Network (RNN) Attention-Performer module 360 disposed between the first and second half feed-forward layers 310, 340, concatenation operators 305, and the layernorm module 350. That is, the second example causal encoder layer 300b replaces the multi-head self-attention module 330 from the first example causal encoder layer 300a (FIG. 3A) with the RNN Attention-Performer module 360. Advantageously, the RNN Attention-Performer module 360 replaces the quadratic attention of the multi-head self-attention module 330 with a more manageable linear attention and leverages low-rank decomposition of the attention tensor.

The RNN Attention-Performer 366 includes a unidirectional performer that performs prefix-sum determinations that emulate causal attention of the multi-head self-attention module. More specifically, the RNN Attention-Performer module 360 determines a matrix by summing outer products of kernel features corresponding to keys with value-vectors. At each iteration of the prefix-sum determination, a kernel feature vector corresponding to a query is multiplied by the prior prefix-sum to generate a new embedding. Here, the RNN Attention-Performer module 360 obtains the prior prefix-sum by summing all outer-products corresponding to preceding tokens. Moreover, RNN Attention-Performer module 360 obtains features by applying rectified linear unit (ReLU) elementwise activations to affinely-transformed queries/keys.

The first half feed-forward layer 310 processes the sequence of acoustic frames 110 (e.g., Mel-spectrogram input sequence). Subsequently, the convolution module 320 subsamples the sequence of acoustic frames 110 concatenated with the output of the first feed-forward layer 310. The RNN Attention-Performer module 360 receives the output of the convolution module 320 concatenated with the output of the first half feed-forward layer 310 and applies linear attention to generate an output. Thereafter, the second half feed-forward layer 340 receives a concatenation of the output of the RNN Attention-Performer module 360 and the output of the convolution module 320. The layernorm module 350 processes the output from the second half feed-forward layer 340 and the multi-head self-attention module 330 output to generate the output 355. The output 355 of the second example causal encoder layer (i.e., RNN Performer layer) 300$b$ is passed on to the next causal encoder layer 300 in the stack of causal encoder layers 300 of the first encoder 210. A last causal encoder layer 300 in the stack of causal encoder layers 300 generates the first higher order feature representation 212 for a corresponding acoustic frame 110 in the sequence of acoustic frames 110.

FIG. 3C is a schematic view of a third example causal encoder layer 300, 300$c$ that may be used to implement one or more of the causal encoder layers 300 from the stack of causal encoder layers 300. The third example causal encoder layer (i.e., convolution blocks) 300$c$ includes the first half feed-forward layer 310, the convolution module 320, and concatenation operators 305. Notably, the third example causal encoder layer 300$c$ does not include any self-attention modules (e.g., multi-head self-attention module 330 and RNN Attention-Performer module 360) thereby reducing the model size and compute resources of the ASR model 200. As will become apparent, the initial encoder layers 300 of the stack of causal encoder layers 300 may include the third example causal encoder layer 300$c$. The first half feed-forward layer 310 processes the sequence of acoustic frames 110 (e.g., Mel-spectrogram input sequence). Subsequently, the convolution module 320 subsamples the sequence of acoustic frames 110 concatenated with the output of the first half feed-forward layer 310 to generate an output 325. The output 325 of the third example causal encoder layer 300$c$ is passed on to the next causal encoder layer 300 in the stack of causal encoder layers 300 of the first encoder 210. A last causal encoder layer 300 in the stack of causal encoder layers 300 (e.g., first or second example causal encoder layer 300$a$, 300$b$) generates the first higher order feature representation 212 for a corresponding acoustic frame 110 in the sequence of acoustic frames 110.

Figure 4A:
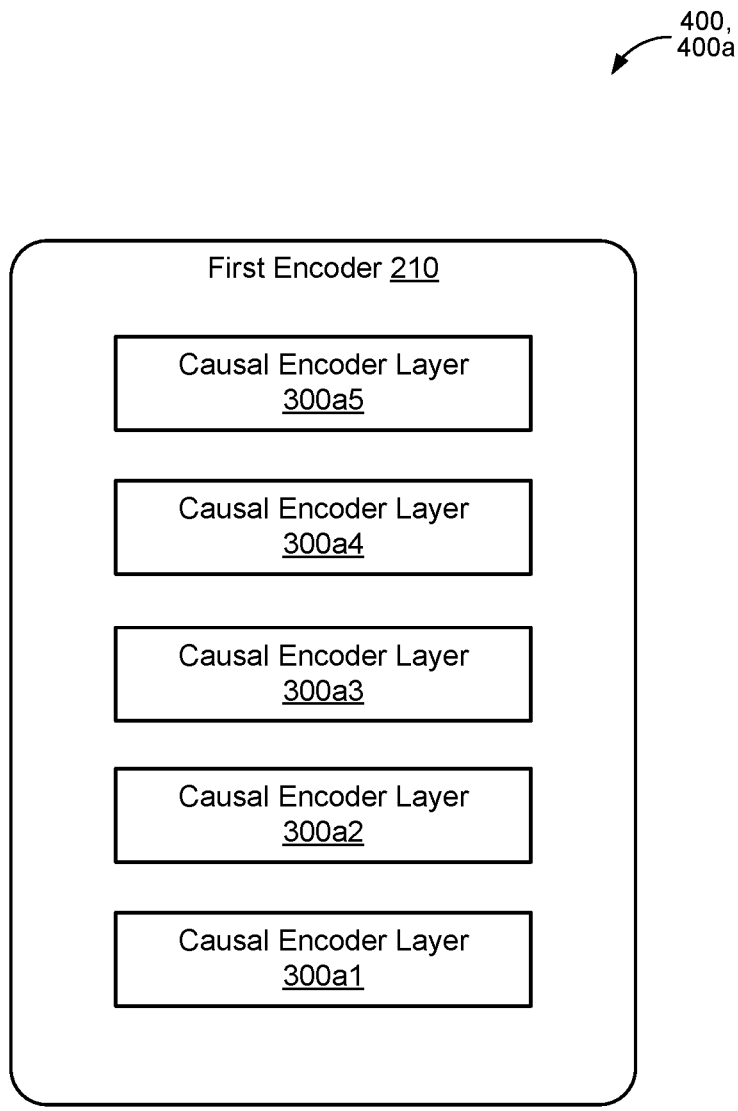
FIGS. 4A-4C are schematic views of various example stacks of causal encoder layers of the ASR model.
Figure 4B:
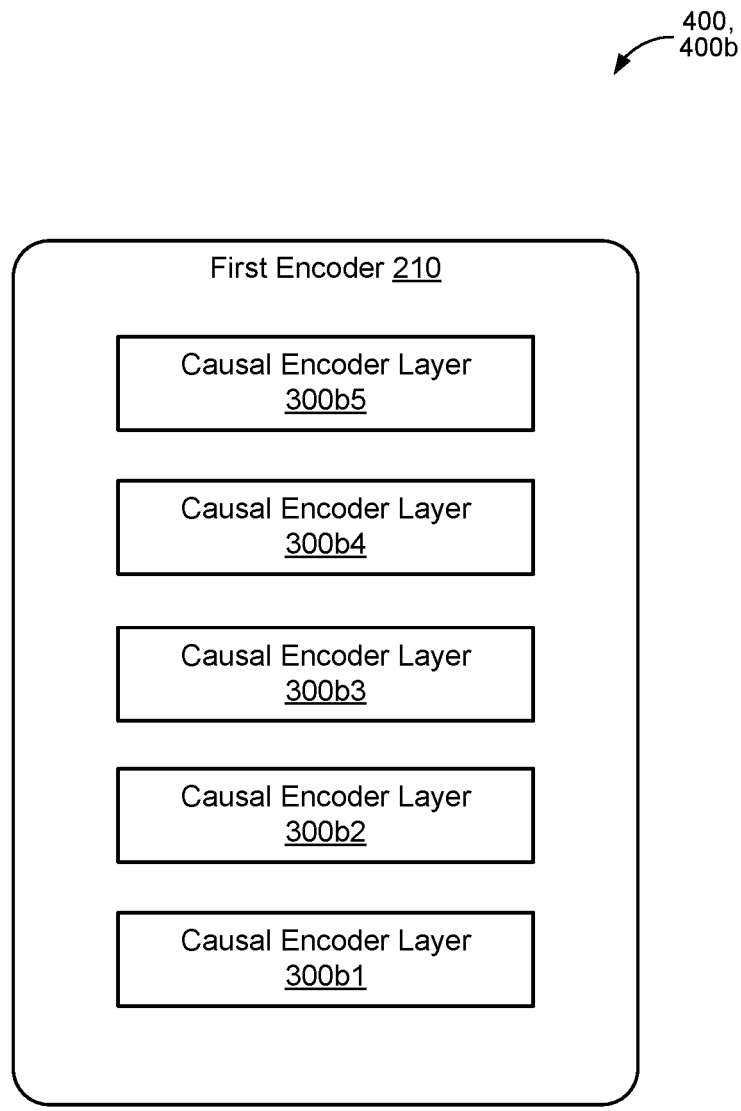
Figure 4C:
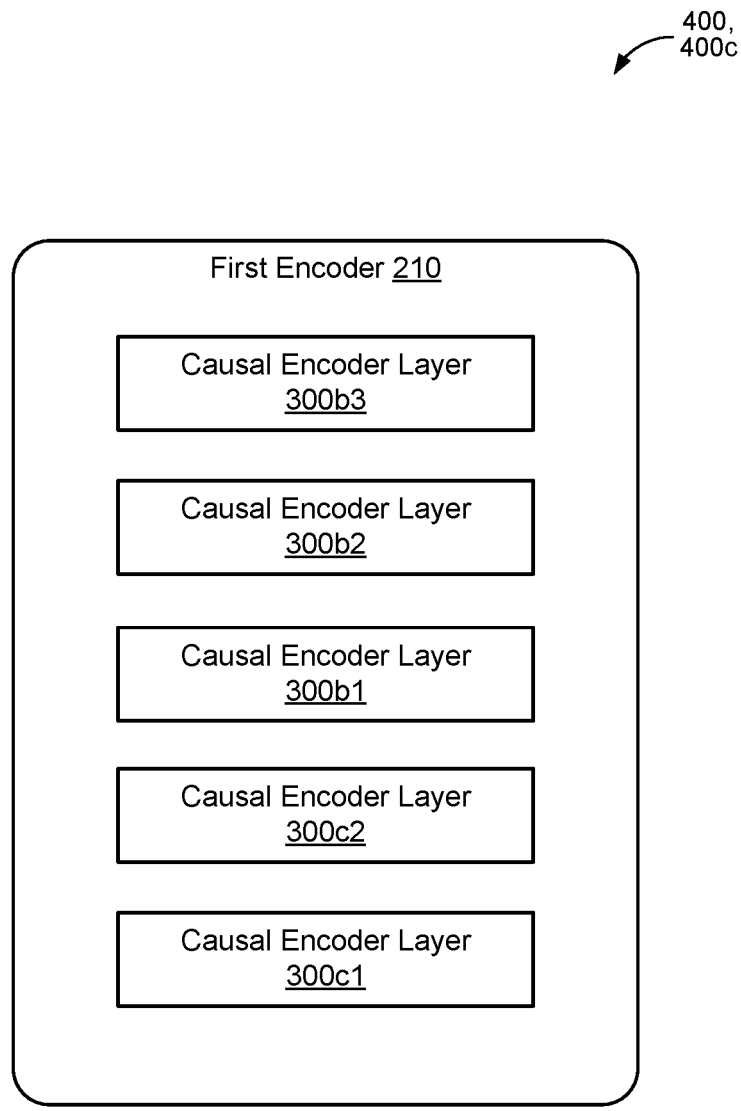

FIGS. 4A-4C include example configurations 400 of the first encoder 210 having various stacks of causal encoder layers 300. The example configurations 400 shown in FIGS. 4A-4C only illustrate the stack of causal encoder layers 300 having five (5) causal encoder layers 300 for the sake of clarity only, as it is understood that the stack of causal encoder layers 300 may include any number of causal encoder layers 300. FIG. 4A illustrates a first configuration 400, 400$a$ of the stack of causal encoder layers 300 for the first encoder 210 during a pre-training stage of the ASR model 200. Here, each causal encoder layer 300 in the stack of causal encoder layers 300 of the first encoder 210 includes the first example causal encoder layers (e.g., conformer layer) 300$a$1-$a$5. Thus, each causal encoder layer 300 in the stack of causal encoder layers 300 the first configuration 400$a$ includes the multi-head self-attention module 330 that performs ordinary self-attention. Since each causal encoder layer 300 in the stack of causal encoder layers of the first configuration 400$a$ includes a conformer layer, the first configuration 400$a$ represents a conformer or encoder whereby each first example causal encoder layer (e.g., conformer layer) uses regular conformer training during the pre-training stage.

FIG. 4B illustrates a second configuration 400, 400$b$ of the stack of causal encoder layers 300 for the first encoder 210 used during fine-tune training, and subsequently inference, of the ASR model 200. Here, each causal encoder layer 300 in the stack of causal encoder layers 300 of the first encoder 210 includes the second example causal encoder layers 300$b$1-$b$5. Stated differently, during fine-tune training the second configuration 400$b$ replaces each of the first example causal encoder layers 300$a$ (FIG. 3A) with the second example causal encoder layers 300$b$ (FIG. 3B). Thus, each causal encoder layer 300 in the stack of causal encoder layers in the second configuration 400$b$ includes the RNN Attention-Performer module 360 that performs linear attention. As such, during fine-tune training and inference the first encoder 210 retains the benefit learnt during pre-training with the multi-head self-attention module 330 while also having the advantage of the smaller latency and smaller model size of the RNN Attention-Performer module 360 of the second example causal encoder layers 300$b$ (FIG. 3B).

FIG. 4C illustrates a third configuration 400, 400$c$ of the first encoder 210 used during fine-tune training and inference of the ASR model 200. Here, the initial causal encoder layers 300 in the stack of causal encoder layers 300 of the first encoder 210 include the third example causal encoder layers 300$c$ and the subsequent causal encoder layers 300 in the stack of causal encoder layers 300 of the first encoder 210 include the second example causal encoder layers 300$b$. Stated differently, during fine-tune training the third configuration 400$c$ replaces each of the first example causal encoder layers 300$a$ (FIG. 3A) in the initial causal encoder layers 300 with third example causal encoder layers 300$c$ and replaces each of the first example causal encoder layers 300$a$ (FIG. 3A) in the subsequent casual encoder layers 300 with the second example causal encoder layers 300$b$. Notably, the only difference between the first example causal encoder layer 300$a$ and the second example causal encoder layer 300$b$ is that the second example causal encoder layer includes the RNN Attention-Performer module 360 rather than the multi-head self-attention module 330. Replacing the multi-head self-attention module 330 with the RNN Attention-Performer module 360 includes applying a trainable affine transformation to convert queries/keys from the multi-head self-attention module 330 into an RNN model (e.g., RNN Attention-Performer module 360) of linear time and constant memory complexity in sequence length.

As shown in FIG. 4C, the first and second causal encoder layers (e.g., initial causal encoder layers) 300$c$1, 300$c$2 include the third example causal encoder layers 300$c$ while the third, fourth, and fifth causal encoder layers 300$b$1-$b$3 (e.g., subsequent causal encoder layers) include the second example causal encoder layers 300b. Although, the initial causal encoder layers are not so limited, for example, the initial causal encoder layers may include any number of layers from the stack of causal encoder layers. The third configuration 400c of the first encoder 210 uses the simpler initial causal encoder layers to hypothesize low-level features and uses the subsequent causal encoder layers that perform linear attention.

Referring back to FIGS. 2A-2C, in some implementations, the encoder 202 is a cascading encoder. The cascading encoder 202 refers to a model structure where the encoding pathway of the first encoder 210 and the second encoder 220 cascade such that the output of the first encoder 210 feeds the input of the second encoder 220 prior to decoding. Here, the first and second encoders 210, 220 can be cascaded irrespective of the underlying architecture for each encoder. In some examples, the first and second encoders 210, 220 include a stack of multi-headed (e.g., 8 heads) attention layers. The stack of multi-headed attention layers may include a stack of conformer layers or a stack of transformer layers. Causal convolution and left-context attention layers may be used for each causal encoder layer in the stack of causal encoder layers of the first encoder 210 to restrict the model from using future inputs. The cascading encoder may include 17 causal encoder layers. Here, the first encoder 210 may include 15 causal encoder layers while the second encoder 220 may include two causal encoder layers that take in additional right context (e.g., 5.04 seconds). The first encoder 210 may be referred to as a causal encoder and the second encoder 220 may be referred to as a non-causal encoder.

Here, the first encoder 210 is a streaming encoder while the second encoder 220 is a non-streaming encoder. In a cascading encoder 202, the second encoder 220 receives the output of the first encoder 210 and may take advantage of the causal encoder layers 300 of the first encoder 210 such that the second encoder includes fewer multi-head attention layers than the first encoder 210. By having fewer layers, the cascading encoder may reduce the number of more computationally expensive layers making the ASR model 200 more streamlined than simply combining a traditional streaming model with a traditional non-streaming model.

Referring now to FIG. 2A, the first encoder 210 reads a sequence of d-dimensional feature vectors (e.g., acoustic frames 110 shown in FIG. 1) $x = (x_1, x_2, \ldots, x_T)$, where $x_t \in \mathbb{R}^d$, and generates, at each output step, the first higher order feature representation 212 for a corresponding acoustic frame 110 in the sequence of acoustic frames 110. Similarly, the second encoder 220 is connected in cascade to the first encoder 210 and is configured to receive the first higher order feature representation 212 generated by the first encoder 210 at each of the plurality of output steps, as input, and generate, at each output step, a second higher order feature representation 222 for a corresponding first higher order feature representation 212. Notably, the second encoder 220 generates the second higher order feature representations 222 using additional right-context (e.g., future input frames) while the first encoder 210 generates the first higher order feature representation 212 without using any additional right-context. Moreover, the second encoder 220 generates the second higher order feature representation 222 using the first higher order feature representation 212 and does not receive any of the acoustic frames 110.

The decoder 204 may include a recurrent neural network-transducer (RNN-T) architecture having a joint network 230 and a prediction network 240. The decoder 204 uses the joint network 230 to combine (i.e., when the model operates in a non-streaming mode) the first and second higher order feature representations 212, 222 output by the encoder 202 at each of the plurality of output steps, as well as a hidden representation 242 output from the prediction network 240 for the previous prediction $y_{r-1}$, to generate a decoder output. When the ASR model 200 operates in the streaming mode, the joint network 230 receives the hidden representation 242 output from the prediction network 240 and only the first higher order feature representation 212 output from the first encoder 210 (e.g., the joint network 230 does not receive the second higher order feature representation 222). The decoder output can be a probability distribution, $P(y_i | y_{i-1}, \ldots, y_0, x)$, over the current sub-word unit, $y_i$, given a sequence of N previous non-blank symbols $(y_{i-1}, \ldots, y_{i-N})$, and input, x. Although not illustrated, the ASR model 200 may include a final softmax layer that receives the output of the decoder 204 and generates the sequence of non-blank symbols. In some implementations, the softmax layer is separate from the decoder 204 and processes the output from the decoder 204. The output of the softmax layer is then used in a beam search process to select orthographic elements. In some implementations, the final softmax layer is integrated with the decoder 204 such that the output of the decoder 204 represents the output of the final softmax layer.

The decoder 204 is configured to generate, at each output step, a probability distribution over possible speech recognition hypotheses. When the ASR model 200 is operating in a streaming mode, the decoder 204 generates a first probability distribution 232 over possible speech recognition hypotheses for a corresponding first higher order feature representation 212. Alternatively, when the ASR model 200 is operating in a non-streaming mode, the decoder 204 generates a second probability distribution 234 over possible speech recognition hypotheses for a corresponding second higher order feature representation 222. Stated differently, the joint network 230 generates, at each output step (e.g. time step), a probability distribution 232, 234 over possible speech recognition hypotheses. Here, the "possible speech recognition hypotheses" correspond to a set of output labels/symbols (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network may output a set of value indicative of the likelihood of occurrence of each of a predetermined set of output labels. This set of values can be a vector (e.g. a one-hot vector) and can indicate a probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The output distribution of the joint network 230 can include a posterior probability value for each of the different output labels. Thus, if there are 100 different output labels representing different graphemes or other symbols, the output of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer) for determining the transcription 120.

Within the decoder 204, the prediction network may have two 2,048-dimensional LSTM layers, each of which is also followed by a 640-dimensional projection layer, such that the LSTM-based prediction network may have about 23.4 million parameters. In other configurations, the prediction network 240 may instead include conformer or transformer layers in lieu of LSTM layers. In yet other configurations, the prediction network 240 includes a V2 embedding lookup table that includes an embedding prediction network. At each time step, the V2 embedding lookup table may receive, as input, the previous two predictions (e.g., 1-hot vectors) output by the joint network 230, determine a respective embedding $d_1$, $d_2$ for each of the previous two predictions, and provide a concatenated output [$d_1$, $d_2$] to the joint network 230. Comparatively, the V2 embedding lookup table may have only about two (2) million parameters, whereas an LSTM-based prediction network may include about 23.4 million parameters. Finally the joint network 230 may also be a one-layer neural network with 640 hidden units.

Continuing with the example in FIG. 2A, in some implementations, the ASR model 200a operating in both the streaming and non-streaming modes in parallel. When operating in both the streaming and non-streaming mode at the same time, the ASR model 200a first performs streaming speech recognition on the sequence of acoustic frames 110 using the first encoder 210 to generate the first higher order feature representation 212 for both the second encoder 220 and the decoder 204. Thereafter, the decoder 204 generates the first probability distribution 232 over possible speech recognition hypotheses to output partial speech recognition results 120, 120a. The ASR model 200b also performs non-streaming speech recognition where the second encoder 220 uses the first higher order feature representation 212 received from the first encoder 210 to generate the second higher order feature representation 222. The decoder 204 then generates the second probability distribution 234 over possible speech recognition hypotheses to output the final speech recognition result 120, 120b. As noted by the time, the decoder 204 output the partial speech recognition results 120a in a streaming fashion using the output from the first encoder 210, and then operating in the non-streaming fashion uses the first higher order feature representation 212 to generate the final speech recognition result 120b. Thus, the final speech recognition result 120b for the input utterance 106 may be delayed from the partial speech recognition results 120a.

Referring to FIG. 2B, in some implementations, the ASR model 200b operating only in the streaming mode. This may occur, for instance, when the user 104 (FIG. 1) is using applications such as voice-search or on-device dictation, which requires as little latency as possible. Here, the encoder 202 operates in a non-cascading mode such that only the first encoder 210 generates an output. More specifically, the ASR model 200b performs streaming speech recension on the sequence of acoustic frames 110 using only the first encoder 210 to generate the first higher order feature representation 212 for the decoder 204. Thereafter, the decoder 204 generates the first probability distribution 232 over possible speech recognition results. Because the streaming mode of the ASR model 200b generates the partial speech recognition results 120a quickly, the inaccuracy of the term "play" is generally acceptable to users.

Referring to FIG. 2C, in some implementations, the ASR model 200c operates only in the non-streaming mode. The non-streaming mode may occur, for instance, in non-latency intensive applications such as when the user (FIG. 1) is viewing a transcription of a voicemail left on his/her phone. As discussed above, this type of application benefits from the second encoder 220 using future context to improve speech recognition accuracy (e.g., word error rate (WER)) in exchange for increased processing times. Here, the ASR model 200c first uses the first encoder 210 to generate the first higher order feature representation 212 at each output step for input to the second encoder 220, but the decoder 204 does not decode any of the first higher order feature representations 212. The ASR model 200c then performs non-streaming speech recognition on the sequence of acoustic frames 110 (e.g., including the additional right-context) whereby the second encoder 220 uses the first higher order feature representation 212 received from the first encoder 210 to generate the second higher order feature representation 222. The decoder 204 then generates the second probability distribution 234 over possible speech recognition hypotheses and produces the final speech recognition result 120b. In this scenario, because producing streaming speech recognition results in real-time has little value to the user and latency is not a factor, the ASR model 200c may simply operate in only the non-streaming mode to generate the final speech recognition result 120b.

Figure 5:
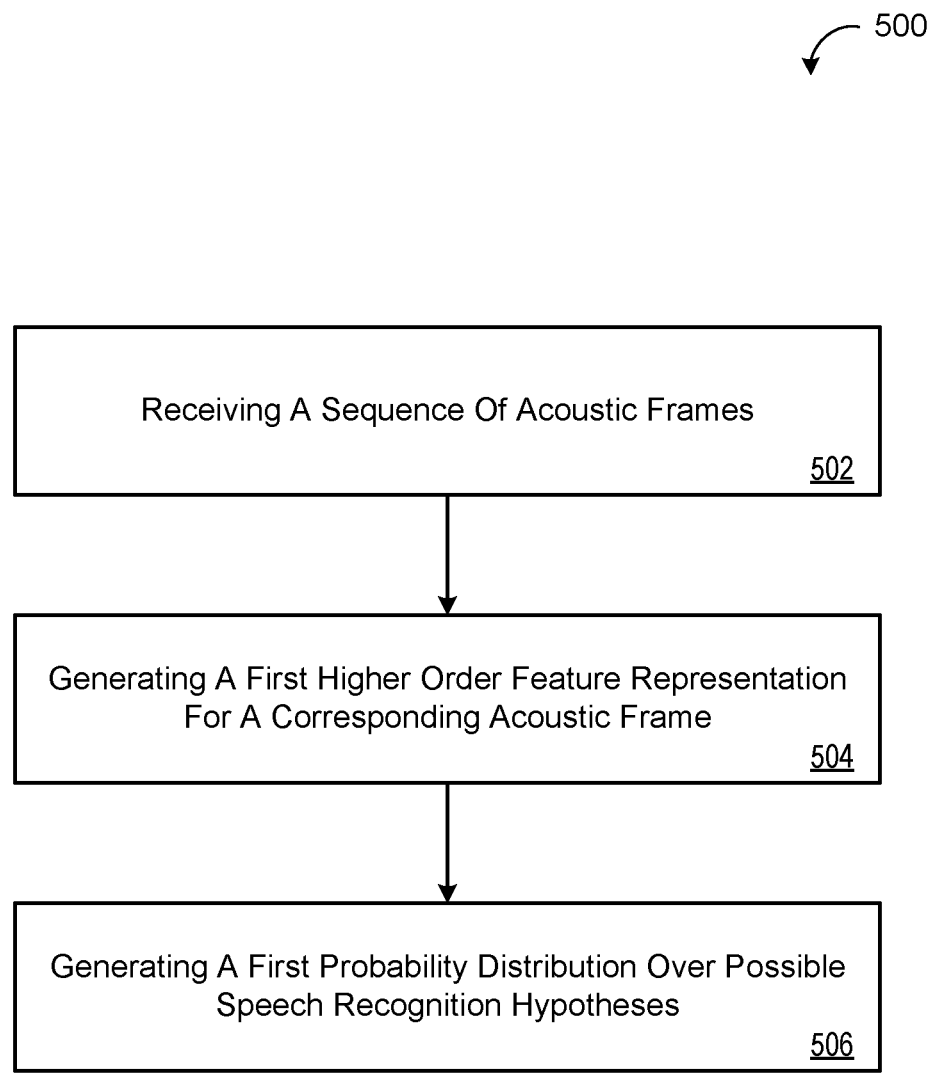
FIG. 5 is a flowchart of an example arrangement of operations for a computer-implemented method of optimizing inference performance of conformers.
Figure 6:
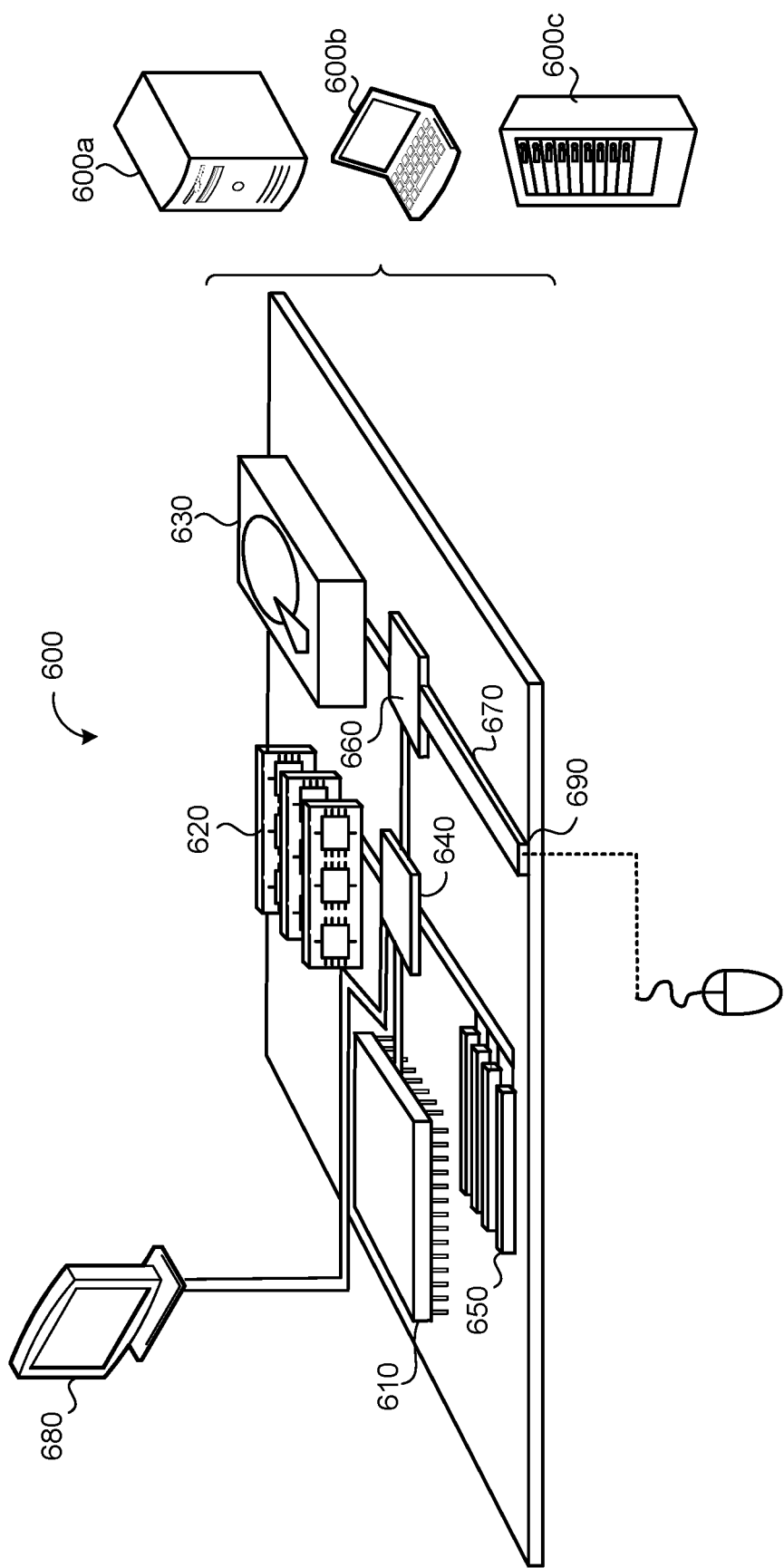
FIG. 6 is a schematic view of an example computing device that may be used to implement the systems and methods described herein.

FIG. 5 is flowchart of an example arrangement of operations for a method 500 of optimizing inference performance for conformers. The method 500 may execute on data processing hardware 610 (FIG. 6) using instructions stored on memory hardware 620 (FIG. 6). The data processing hardware 610 and the memory hardware 620 may reside on the user device 10 and/or the remote computing device 60 of FIG. 1 corresponding to a computing device 600 (FIG. 6).

At operation 502, the method 500 includes receiving a sequence of acoustic frames 110 as input to an ASR model 200. Here, the ASR model 200 includes a causal encoder (i.e., first encoder) 210 and a decoder 204. At operation 504, the method 500 includes generating, by the causal encoder 210, at each of the plurality of output steps, a first higher order feature representation 212 for a corresponding acoustic frame 110 in the sequence of acoustic frames 110. At operation 506, the method 500 includes generating, by the decoder 204, at each of the plurality of output steps, a first probability distribution 232 over possible speech recognition hypotheses. Here, the causal encoder 210 includes a stack of causal encoder layers 300 each including a RNN Attention-Performer module 360 that applies linear attention.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising data processing hardware and memory hardware in communication with the data processing hardware and storing instructions that when executed on the data processing hardware causes the data processing hardware to perform operations that comprise implementing an automated speech recognition (ASR) model, the ASR model comprising:
   a causal encoder comprising a stack of causal encoder layers, the causal encoder configured to:
      receive, as input, a sequence of acoustic frames; and
      generate, at each of a plurality of output steps, a first higher order feature representation for a corresponding acoustic frame in the sequence of acoustic frames; and
   a decoder configured to:
      receive, as input, the first higher order feature representation generated by the causal encoder at each of the plurality of output steps; and
      generate, at each of the plurality of output steps, a first probability distribution over possible speech recognition hypotheses,
   wherein each causal encoder layer in the stack of causal encoder layers includes a Recurrent Neural Network (RNN) Attention-Performer module that applies linear attention,
   wherein, during pre-training of the ASR model, each causal encoder layer comprises:
      a first feedforward module;
      a convolution module;
      a multi-head attention module;
      a second feedforward module; and
      a layernorm module.

2. The system of claim 1, wherein, during fine-tune training of the ASR model, each causal encoder layer comprises:
   the first feedforward module;
   the convolution module;
   the RNN Attention-Performer module;
   the second feedforward module; and
   the layernorm module.

3. The system of claim 2, wherein each causal encoder layer is pre-trained using regular conformer training for the multi-head attention module and is fine-tuned by replacing the multi-head attention module with the RNN Attention-Performer module.

4. The system of claim 3, wherein replacing the multi-head attention module with the RNN Attention-Performer module comprises applying a trainable affine transformation to convert queries/keys from the pre-trained multi-head attention module into an RNN model of linear time and constant memory complexity in sequence length.

5. The system of claim 1, wherein the causal encoder further comprises an initial stack of convolution blocks without self-attention.

6. The system of claim 1, wherein the ASR model further comprises:
   a non-causal encoder configured to:
      receive, as input, the first higher order feature representation generated by the causal encoder at each of the plurality of output steps; and
      generate, at each of the plurality of output steps, a second higher order feature representation for a corresponding first higher order feature representation,
   wherein the decoder is further configured to:
      receive, as input, the second higher order feature representation generated by the non-causal encoder at each of the plurality of output steps; and
      generate, at each of the plurality of output steps, a second probability distribution over possible speech recognition hypotheses.

7. The system claim 6, wherein the decoder comprises:
   a prediction network configured to:
      receive, as input, a sequence of non-blank symbols output by a final softmax layer; and
      generate, at each of the plurality of output steps, a dense representation; and
   a joint network configured to:
      receive, as input, the dense representation generated by the prediction network at each of the plurality of output steps and one of:
         when the ASR model is operating in a streaming mode, the first higher order feature representation generated by the causal encoder at each of the plurality of output steps; or
         when the ASR model is operating in a non-streaming mode, the second higher order feature representation generated by the non-causal encoder at each of the plurality of output steps; and
      generate, at each of the plurality of output steps, one of:
         when the ASR model is operating in the streaming mode, the first probability distribution over possible speech recognition hypotheses; or
         when the ASR model is operating in the non-streaming mode, the second probability distribution over possible speech recognition hypotheses.

8. The system of claim 7, wherein the prediction network comprises a long short-term memory (LSTM)-based prediction network.

9. The system of claim 7, wherein the prediction network comprises a V2 embedding look-up table.

10. A computer-implemented method when executed by data processing hardware causes the data processing hardware to perform operations comprising:
   receiving, as input to an automatic speech recognition (ASR) model, a sequence of acoustic frames, wherein the ASR model comprises a causal encoder and a decoder;
   generating, by the causal encoder, at each of a plurality of output steps, a first higher order feature representation for a corresponding acoustic frame in the sequence of acoustic frames; and
   generating, by the decoder, at each of the plurality of output steps, a first probability distribution over possible speech recognition hypotheses,
   wherein the causal encoder comprises a stack of causal encoder layers, each causal encoder layer in the stack of causal encoder layers comprising a Recurrent Neural Network (RNN) Attention-Performer module that applies linear attention,
wherein, during pre-training of the ASR model, each causal encoder layer comprises:
a first feedforward module;
a convolution module;
a multi-head attention module;
a second feedforward module; and
a layernorm module.

11. The computer-implemented method of claim 10, wherein, during fine-tune training of the ASR model, each causal encoder layer comprises:
the first feedforward module;
the convolution module;
the RNN Attention-Performer module;
the second feedforward module; and
the layernorm module.

12. The computer-implemented method of claim 11, wherein the operations further comprise:
pre-training each causal encoder layer using regular conformer training for the multi-head attention module; and
fine-tuning each causal encoder layer by replacing the multi-head attention module with the RNN Attention-Performer module.

13. The computer-implemented method of claim 12, wherein replacing the multi-head attention module with the RNN Attention-Performer module comprises applying a trainable affine transformation to convert queries/keys from the pre-trained multi-head attention module into an RNN model of linear time and constant memory complexity in sequence length.

14. The computer-implemented method of claim 10, wherein the causal encoder further comprises an initial stack of convolution blocks without self-attention.

15. The computer-implemented method of claim 10, wherein the operations further comprise:
generating, by a non-causal encoder of the ASR model, at each of the plurality of output steps, a second higher order feature representation for a corresponding first higher order feature representation generated by the causal encoder; and
generating, by the decoder, at each of the plurality of output steps, a second probability distribution over possible speech recognition hypotheses for a corresponding second higher order feature representation.

16. The computer-implemented method of claim 15, wherein the operations further comprise:
receiving, as input at a prediction network of the decoder, a sequence of non-blank symbols output by a final softmax layer;
generating, by the prediction network, a dense representation; and
generating, by a joint network of the decoder, one of:
when the ASR model is operating in a streaming mode, the first probability distribution over possible speech recognition hypotheses; or
when the ASR model is operating in a non-streaming mode, the second probability distribution over possible speech recognition hypotheses.

17. The computer-implemented method of claim 16, wherein the prediction network comprises a long short-term memory (LSTM)-based prediction network.

18. The computer-implemented method of claim 16, wherein the prediction network comprises a V2 embedding look-up table.

* * * * *